United States Patent
Yuan et al.

(10) Patent No.: US 8,547,421 B2
(45) Date of Patent: Oct. 1, 2013

(54) SYSTEM FOR ADAPTIVE DISPLAYS

(75) Inventors: Chang Yuan, Vancouver, WA (US);
Scott J. Daly, Kalama, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 477 days.

(21) Appl. No.: 12/856,184

(22) Filed: Aug. 13, 2010

(65) Prior Publication Data
US 2012/0038751 A1   Feb. 16, 2012

(51) Int. Cl.
*H04N 7/18*   (2006.01)

(52) U.S. Cl.
USPC ............................... 348/51; 348/42

(58) Field of Classification Search
USPC ..................... 348/42–60, 162–171
See application file for complete search history.

(56) References Cited

U.S. PATENT DOCUMENTS

| | | | |
|---|---|---|---|
| 5,761,543 A | 6/1998 | Yamada et al. | |
| 7,408,598 B2 | 8/2008 | de Boer et al. | |
| 7,535,468 B2 * | 5/2009 | Uy | 345/207 |
| 2003/0048394 A1 | 3/2003 | Okuwaki et al. | |
| 2007/0236485 A1 * | 10/2007 | Trepte | 345/207 |
| 2008/0024523 A1 * | 1/2008 | Tomite et al. | 345/632 |
| 2008/0252556 A1 * | 10/2008 | Tseng et al. | 345/6 |
| 2008/0294012 A1 * | 11/2008 | Kurtz et al. | 600/300 |
| 2009/0009628 A1 * | 1/2009 | Janicek | 348/231.99 |
| 2010/0013796 A1 | 1/2010 | Abileah et al. | |
| 2010/0283765 A1 | 11/2010 | Gotoh et al. | |
| 2010/0289784 A1 | 11/2010 | Fujioka et al. | |
| 2011/0007047 A1 | 1/2011 | Fujioka et al. | |

FOREIGN PATENT DOCUMENTS

| | | |
|---|---|---|
| EP | 2080084 A1 | 7/2009 |
| JP | 62-077794 A | 4/1987 |
| JP | 02-059896 A | 2/1990 |
| JP | 03-244006 A | 10/1991 |
| JP | 2001-147109 A | 5/2001 |
| WO | 2009104667 A1 | 8/2009 |
| WO | 2010055710 A1 | 5/2010 |

OTHER PUBLICATIONS

International Search Report, International App. No. PCT/JP2011/068409, filed Aug. 5, 2011 by Sharp Kabushiki Kaisha, Search Report dated Sep. 20, 2011, 8 pgs.

* cited by examiner

*Primary Examiner* — Andy Rao
(74) *Attorney, Agent, or Firm* — Chernoff Vilhauer McClung & Stenzel, LLP

(57) ABSTRACT

A display includes an integrated imaging sensor and a plurality of pixels. The imaging sensor integrated within the display includes a plurality of individual sensors each of which provides an output. The content of the display is modified based upon the sensed content.

23 Claims, 16 Drawing Sheets

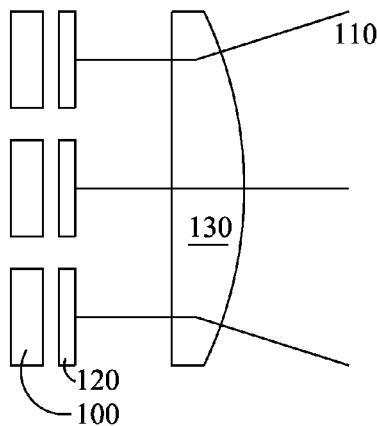
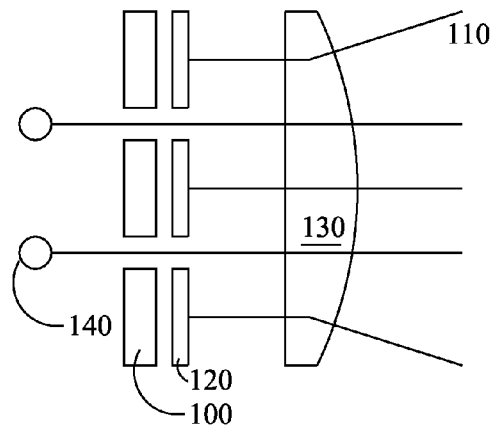
FIG. 1A
FIG. 1B
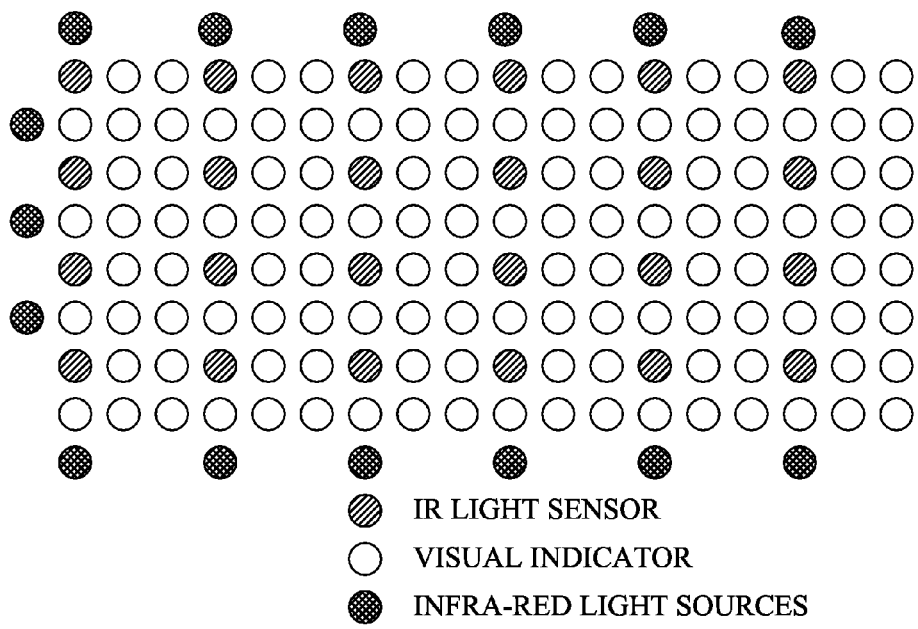
FIG. 2A

SYSTEM FOR ADAPTIVE DISPLAYS

CROSS-REFERENCE TO RELATED APPLICATIONS

Not applicable.

BACKGROUND OF THE INVENTION

The present invention relates to a display with an imaging sensor.

There exists "seeing" displays that can sense viewers. Such "seeing" displays utilize optical sensors to capture images of the scene in front of the display. The images are analyzed for making the display interact with the environment.

One technique to construct a seeing display is to mount external video cameras in front of or on the boundary of the display system. Another technique to construct a seeing display utilizes 3D depth cameras to capture the 3D depth map of objects in front of the display in real time. Such 3D depth cameras typically also emit infra-red lights toward the scene in front of the display and estimate the 3D depth of the objects based on the time-of-flight of reflected lights. Another technique to construct a seeing display uses embedded optical sensors in or behind the panels for sensing the image in front of the display.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIGS. 1A and 1B illustrate a conceptual design of optical sensors.

FIGS. 2A-2D illustrate a general design of the optical sensing module.

DETAILED DESCRIPTION OF PREFERRED EMBODIMENT

Figure 2B:
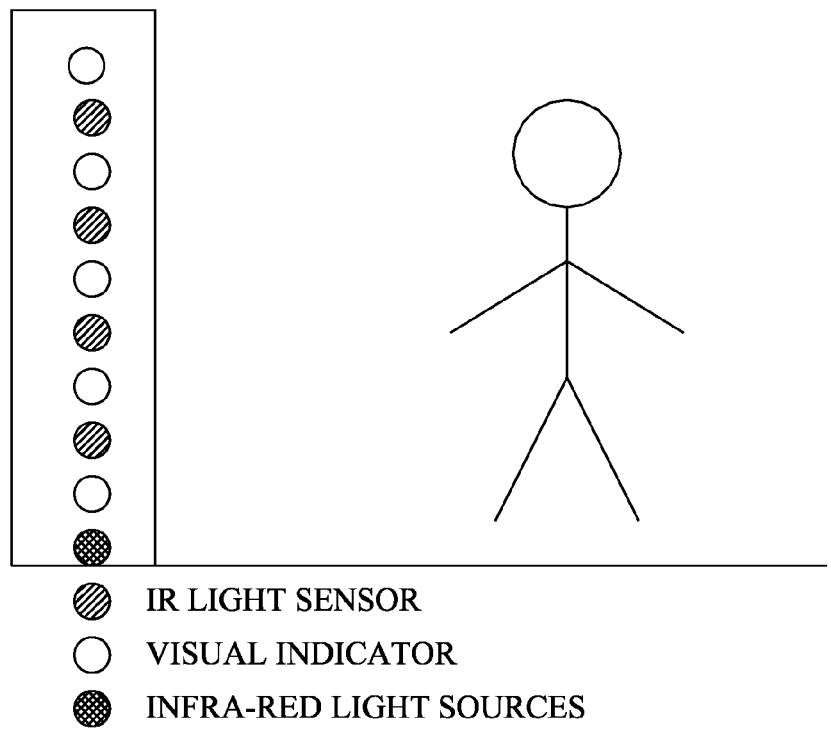
Figures 3A, 3B, 3C:
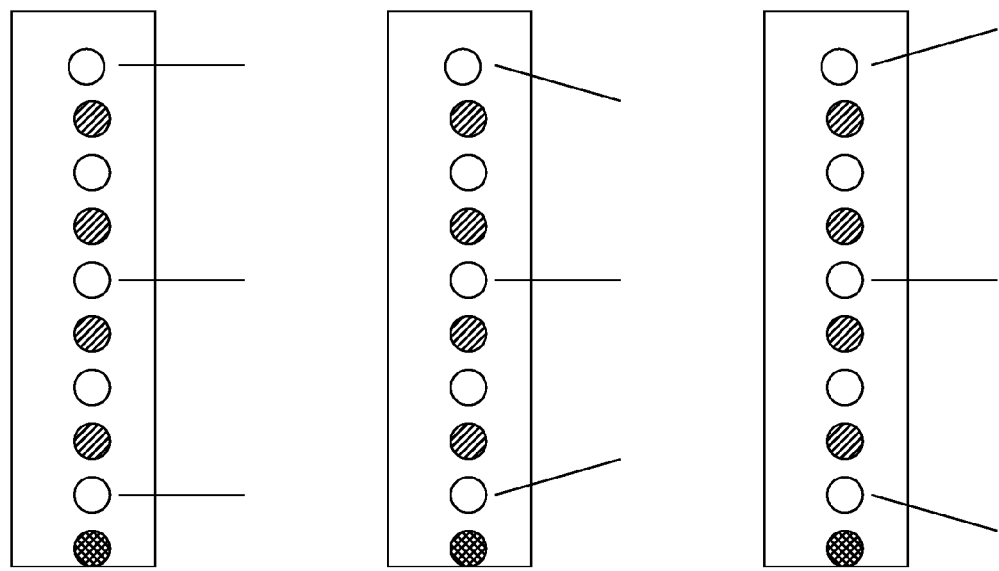
FIGS. 3A-3F illustrate various orientations of optical sensors.

The seeing capability for a display system is enabled by integrating an optical sensing module with the display. The optical sensing module contains an array of optical sensors. Each optical sensor may consist of four components, as shown in FIG. 1. Referring to FIG. 1A, a photoreceptor 100 generates electronic images as the response to the photonic signals 110 that reaches its surface. The number of pixels in the photoreceptor may range from only 1×1 to 16×16, or any suitable arrangement. A transparent optical film based filter 120 is attached to the frontal side of each photoreceptor and allows primarily visible light or infra-red light to pass through. A convex micro lens 130 gathers lights through a small aperture and refracts them toward the photoreceptor 100. Referring to FIG. 1B, an optional infra-red (IR) light source 140 projects IR lights towards the scene in front of the display.

The optical path through the optical sensor is also shown in FIG. 1. The light rays 110 reflected from the scene in front of the display first pass through the micro lens 130, then the optical filter 120, and finally reaches the photoreceptors 100. Due to the convex shape of the micros lens 130, the parallel light rays 110 will converge at the photoreceptors 100. As the micro lens 130 has a small aperture and small refraction index, the amount of light that reaches the photoreceptor 100 is limited. This results in a possibly dark and blurry image with the limited view of the scene.

The seeing display largely depends on the lights reflected from or provided from the scene in front of the display. The lighting conditions in front of the display may be quite different. For example, the ambient light in outdoor environments is very strong, resulting in bright images in the visible light range and over-saturated images in the IR range. On the other hand, the indoor environments are usually darker, in which the visual light images become under saturated while the IR image sensors become more reliable.

In order to accommodate different ambient lighting conditions, different kinds of sensors or their combination may be used. A visual light sensor is primarily sensitive only to visible lights and generates either grayscale or RGB color images, as shown in FIG. 1A. A visible light filter that primarily allows only visible lights to pass through is attached to the photoreceptor. The IR light source is not necessary in this sensor. Referring to FIG. 1B, an infra-red light sensor is primarily sensitive only to the IR lights and generates grayscale images. Similarly, an optical film that primarily allows only IR lights to pass through is attached to the photoreceptor. As the IR lights from the viewing environment may not be strong enough, an IR light source, e.g., LED array, may be placed behind the photoreceptor and projects more lights to the outside world, eventually increasing the IR lights reflected from the scene.

The optical sensors can be adjusted to suit particular needs. The sensor may be changed from one kind of sensor to another kind of sensor. Also, a combination of different kinds of sensor may be included within the same display. The micro lens can be made thinner and moved closer to the photoreceptors, which decreases the focal length of sensor. Inversely, the lens can be made thicker and moved farther from the photoreceptors in order to increase the focal length. The strength of the IR light source can be modified to adapt to the viewing environment. A stronger IR light, although consuming more energy, increases the sensing range.

The individual optical sensor is a sensing unit that observes a small part of the scene and typically senses a blurry image. The compound eyes found in arthropods, such as dragonflies an honey bees, combines thousands or more of these sensing units to generate a consistent view of the whole scene. In analogy to the natural compound eyes, an optical sensing module is preferably designed to integrate a plurality or tens or hundreds or thousands or more optical sensors.

Instead of constructing a separate imaging device, the sensing module may be integrated into the display system by replacing part of the pixel array with optical sensors and including additional electronic components interconnected to the sensors. The module may likewise be in front or behind the pixel array. Integration of optical sensors with the display device does not substantially impair the main display functionality, does not substantially reduce display quality, nor does it substantially increase the number of defects in the device. A number of techniques may be used to reduce noticeable decreases in display quality. For example, one technique includes the sensors being constructed in a form factor generally the same size as or smaller than the sub-pixels (red, green, or blue) on the display surface, so that they will not be noticed by the viewers at a normal viewing distance. Another technique includes each sensor replacing a partial portion of a sub-pixel which will tend to have minimal effects on the display quality. For back lighting based display devices, the colors of the sub-pixels are selected so that the reduced light in that color is least noticeable by viewers. For example, the blue sub-pixel is selected for placing the sensors as human eyes are least sensitive to blue (associated with a majority of the blue pixels and/or associated with blue pixels to a greater extent than the other pixels). The optical components of the sensors are made transparent, so that the lights occluded by the sensors are reduced. Also, the sensors may only emit IR lights if needed, which do not interfere with the rendered content in the visible light range. A minimal density of the embedded optical sensors is selected as long as the captured image is above the minimal pixel resolution. In other words, as long as the density or the number of optical sensors is enough for the application, no more sensors are necessary.

The general design of the optical sensing module for various kinds of display systems is illustrated in FIG. 2. In FIGS. 2A and 2B, the sizes of sensors and light sources are exaggerated for illustration. Both visible light and IR light sensors are embedded into the pixel array on the frontal surface of the display. The optical sensors are preferably evenly distributed across a majority of, or all, of the pixel array. Different kinds of sensors may be distributed intermittently to cover the same field of view, similar to the interlaced pixels in the video display.

Each IR light sensor, or groups of sensors, may also include an IR light source that is placed near the photoreceptor. Additional IR light sources may also be embedded in the boundary of the display device. These IR light sources project IR light toward the objects in front of the display and increase the light reflected by the objects, thus enabling the sensing module to see a larger range in front of the display and to capture brighter images. In general, IR light sensors are less susceptible to changes in illumination of a typical viewing environment than visible light sensors. Visible light sources are especially suitable for determining the location of light sources in the environment. In the event that the LCD has LED based backlight, then the range of the LED may be expanded to provide illumination in the IR range. For example, the LED may provide substantial emission in both the visible light range (380 nm to 750 nm) and the near infra-red light range (700 nm to 1400 nm).

Figure 2C:
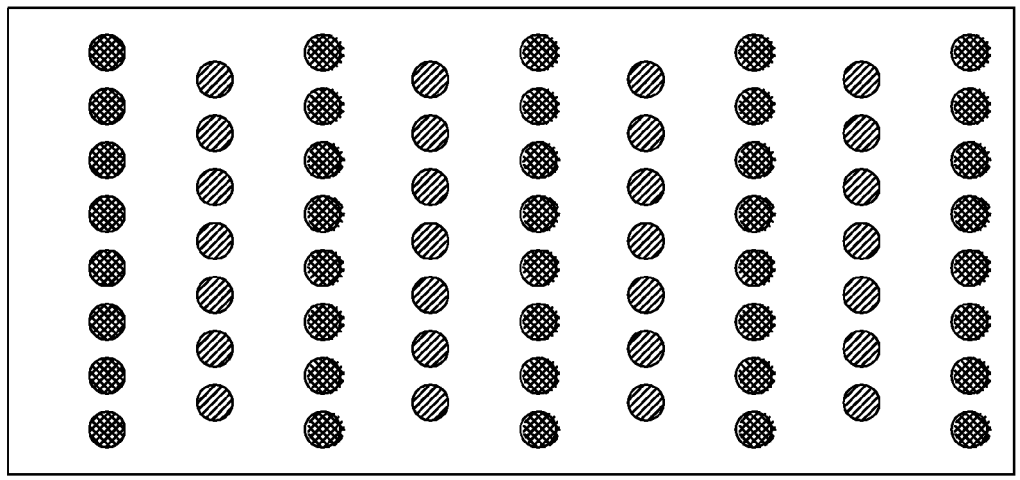
Figure 2D:
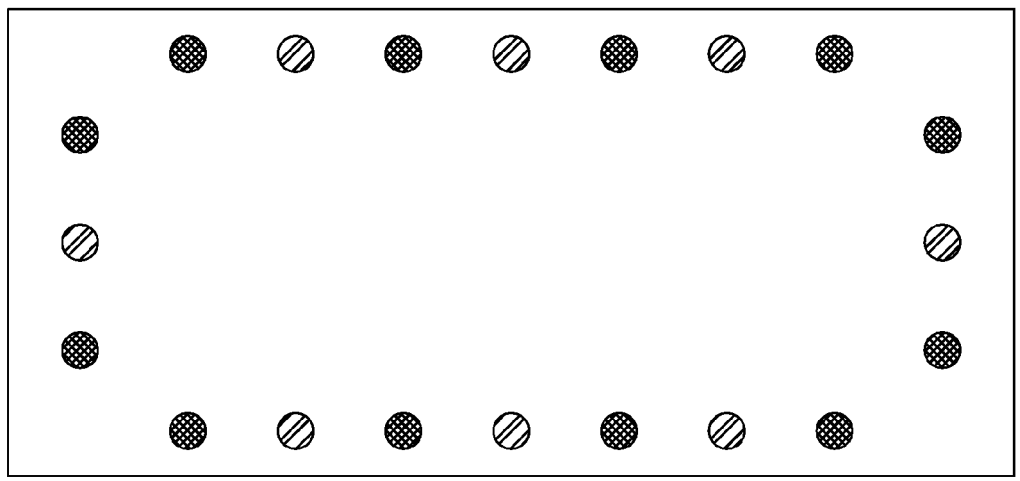

A modified sensor design includes each LED (as the lighting source) being bundled with the optical sensor, so that they function as a single integrated unit. Referring to FIG. 2C, a local-dimming array configuration includes each LED being bundled with the optical sensor and placed at substantially the same position. Referring to FIG. 2D, in an edge-lit configuration the optical sensors are added to accompany each LED along the display edges. In both cases, more standalone optical sensors can be added to improve the sensing range and accuracy.

Flexible configuration of compound-eye optical sensors can be selected for various applications:

(1) Besides the even-space layouts shown in FIG. 2, the optical sensors can be also distributed in other layouts. For example, the sensors can be placed in hexagonal grids in analogy to a bee's honeycomb, as the hexagonal shape spans the maximum area with the minimum expenditure of materials. Moreover, the layout may be random, or with any configuration.

(2) The density of optical sensors can also be made adaptive to the viewing environment. For example, the viewers are more likely to face the central regions of the display screen, especially for a large display. Therefore, more optical sensors can be placed in the central regions while the rest of the areas on the screen are embedded with less optical sensors.

(3) The percentage of visible light or IR light sensors over the whole set of sensors may be adjusted. For a display mainly used in outdoor environments, it is preferable to embed more visible light sensors in the display surface as sunlight introduces IR aberration. For a display used mainly in dark environments, more IR light sensors will improve the sensed image as the IR lights can still be seen in a dark environment.

(4) The focal length of each optical sensor can be adjusted. If the optical sensors are made with the same specification, only a certain depth range of the scene is in focus. When the focal length of optical sensors is adjusted by using different micro lens and moving the photoreceptors, the compound-eye sensing module can see the scene at different focal lengths at the same time. This adjustment makes the captured images appear sharp at all the depth ranges and is inherently suited for the estimation of 3D depth images.

(5) The orientations or optical axes of optical sensors can be adjusted, as shown in FIG. 3. The optical axis of an optical sensor is determined by the shape of micro lens and the orientation of the photoreceptor. If the micro lens is etched to a skewed shape and the photoreceptor is rotated with a controlled angle, the optical axis of the sensor can be changed. The orientations of the sensors can be adjusted from their standard configuration in which all the sensors have parallel optical axes (FIG. 3A). The sensors can be rotated such that their optical axes converge in front of the display (FIG. 3B). This assists in the generation of sharp images while reducing the field of view. Inversely, the sensors with diverging optical axes gain a larger field of view while losing certain amount of image sharpness (FIG. 3C). This makes the compound-eye module act as a large virtual lens in a planar, convex, or concave shape.

Figure 3D:
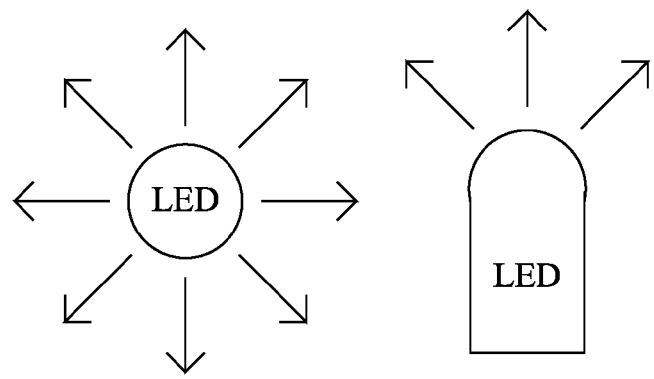
Figure 3E:
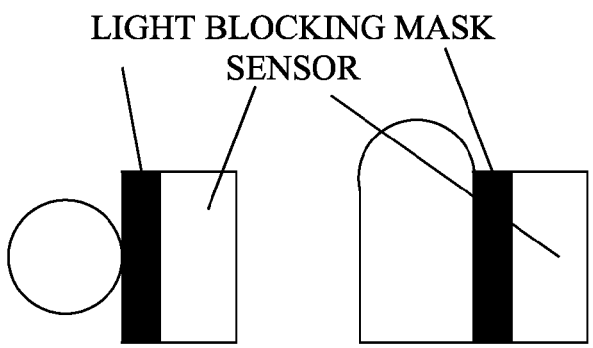
Figure 3F:
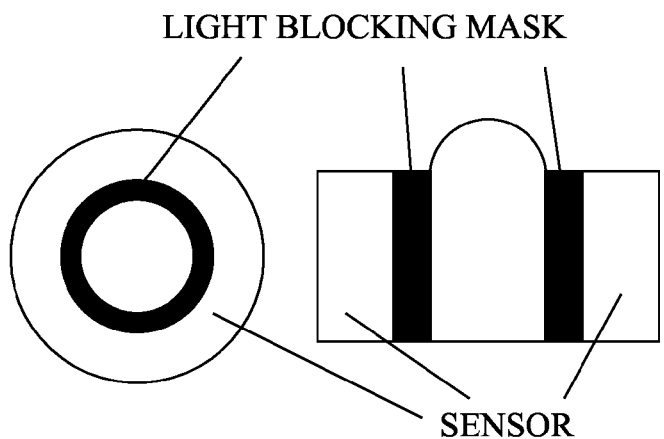

Each LED may be bundled with an optical sensor as shown in FIG. 3D, as part of the compound-eye seeing display. As shown in FIG. 3D, regular LEDs emit lights into the space and do not have the capability to sense the incoming lights. An optical sensor may be bundled with the LED and placed side-by-side, as shown FIG. 3E. Another bundling form is to place the optical sensor around the LED, as shown in FIG. 3F. In either form (side-by-side or surrounded), a light-blocking material may be inserted between the LED and sensor, so that the sensor will not pick up the lights directly from the LED. The light-blocking material also helps reduce the temperature for the optical sensor so as to reduce the sensor noise. At the same time, the infra-red blocking filters within the optical sensor may be removed.

Bundling each LED with an optical sensor facilitates the sensor increasing the amount of lights reflected from the ambient environment (originally emitted from the LED), especially when there are no other light sources in the environment. Otherwise, the sensors may receive significantly less incidental light if there are no other light sources nearby. Also, the bundled LED+sensor pair may be provided without bringing dramatic changes to the manufacturing process of the display.

Also, the optical sensing module can fit to the flexible shape of the display for flexible and foldable display screens in various 3D shapes, including planar, spherical, cylindrical, etc. As each sensor is small enough to deform together with its adjacent sub-pixels, the seeing functionality of flexible display is not substantially affected by the shape deformation.

Figure 4:
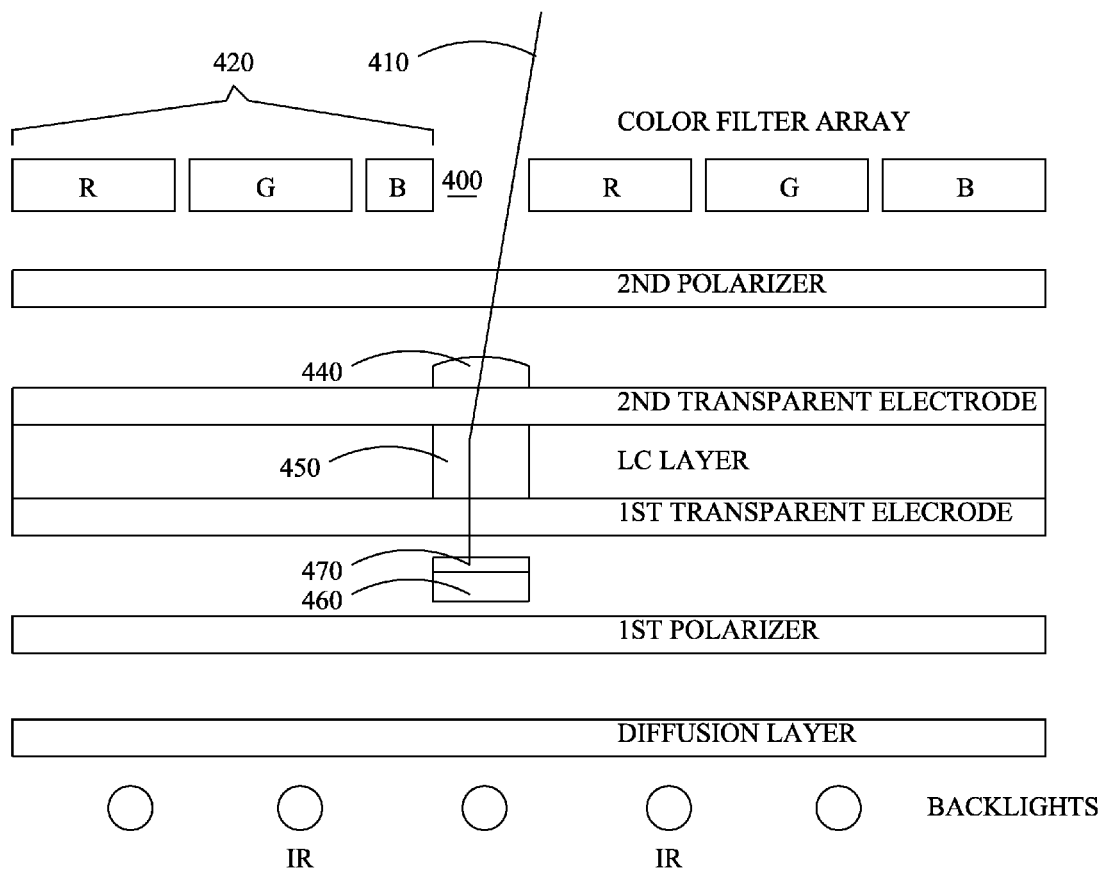
FIG. 4 illustrates design of optical sensing modules for LCDs.

If the display system is known to be made of LCD panels, the optical sensors may be embedded into the LCD screen. The design may take advantage of the common structure of LCD devices and modifies the layers within an LCD, as shown in FIG. 4. In particular, the modification may include the following elements, starting from the back side of the LCD.

(1) An IR light source may be added to the same layer as the fluorescent backlights. The light emitted by IR light sources becomes substantially uniformly distributed after passing the diffusion layer. This will help in collecting more light reflected from the surface of the outside world.

(2) A CMOS sensor may be placed between the first polarizer and first transparent electrode layer. This sensor generated electronic images as the response to the lights coming from the outside world. The sensor is made smaller than a sub-pixel, so the light from the backlight forming the displayed image that would be occluded by sensor will not be visually noticeable.

(3) A transparent polymer electrode is attached to the second transparent electrode layer to generate an LC lens. This additional electrode is etched to a parabolic or wedged shape and applies the voltage to the LC layer. It is controlled independently and is active when the sensor needs to capture the images.

(4) Circuitry may be added to synchronize the electrode and CMOS sensor. The electrode is activated in synchronization with the CMOS sensor so that the light passing through LC lens reaches the sensor at the same time in a pre-defined frequency. For example, the circuitry applies the charges 30 times per second, so that the captured images are updated in 30 frames per second.

(5) A small hole may be cut from the one of the RGB color filters, so that external lights may pass through the layers and reach the CMOS sensor. A preferred color is blue as human eyes are less sensitive to the loss of blue light. The area of this hole can be less or around 50% of that of the original sub-pixel color filter.

The LC lens created by the parabolic or wedged electrode may be part of the design. When a voltage is charged by the electrode, the LC molecules become untwisted to different directions, and generate a LC lens. The LC lens acts as a prism created within the LC layer and transmits and refracts the light. The light passing through the LC lens will be bent towards the photoreceptor in the back side.

A favorable property of the LC lens is that its focal length is electrically controllable by varying voltages from the electrode. The change of focal length is also continuous under continuously varying voltage. Despite the variable focal length, the LC layer does not change their physical shape and keeps a thin form factor. This is an advantage over the traditional lenses; the latter may need to change their physical shape and occupy more physical space to achieve different focal lengths.

The electrically controllable LC lens may be used to create flexible optical sensing components. When all the LC lenses are created by the same voltage, the compound-eye sensing module works as a virtual large lends with a controlled focal length. On the other hand, the voltage of different electrodes can be evenly selected within a range so that the generated LC lenses have smoothly increasing focal lengths. The corresponding sensors may observe a variably controlled depth of focus and keep every object within this range in focus. In general, it is preferred that these sensor arrays have a resulting depth of focus of greater than 5 mm and more preferably greater than 10 mm. More particularly, it is preferred that the sensor arrays are suitable for focusing on content that is ¼ display height, and more preferably ½ display height, and more preferably a display height or more away.

Another property of the LC lens is that it will not substantially leak the backlights to the outside world. In traditional LCDs, the light passing through the first polarizer cannot pass the second one if the LC modules are untwisted. In this case, the molecules are untwisted when the voltage is applied to create the LC lens, so only the external lights will come in, while the backlights will not be leaked out. The voltage should be selected to reduce the leakage of the backlight.

Figure 5:
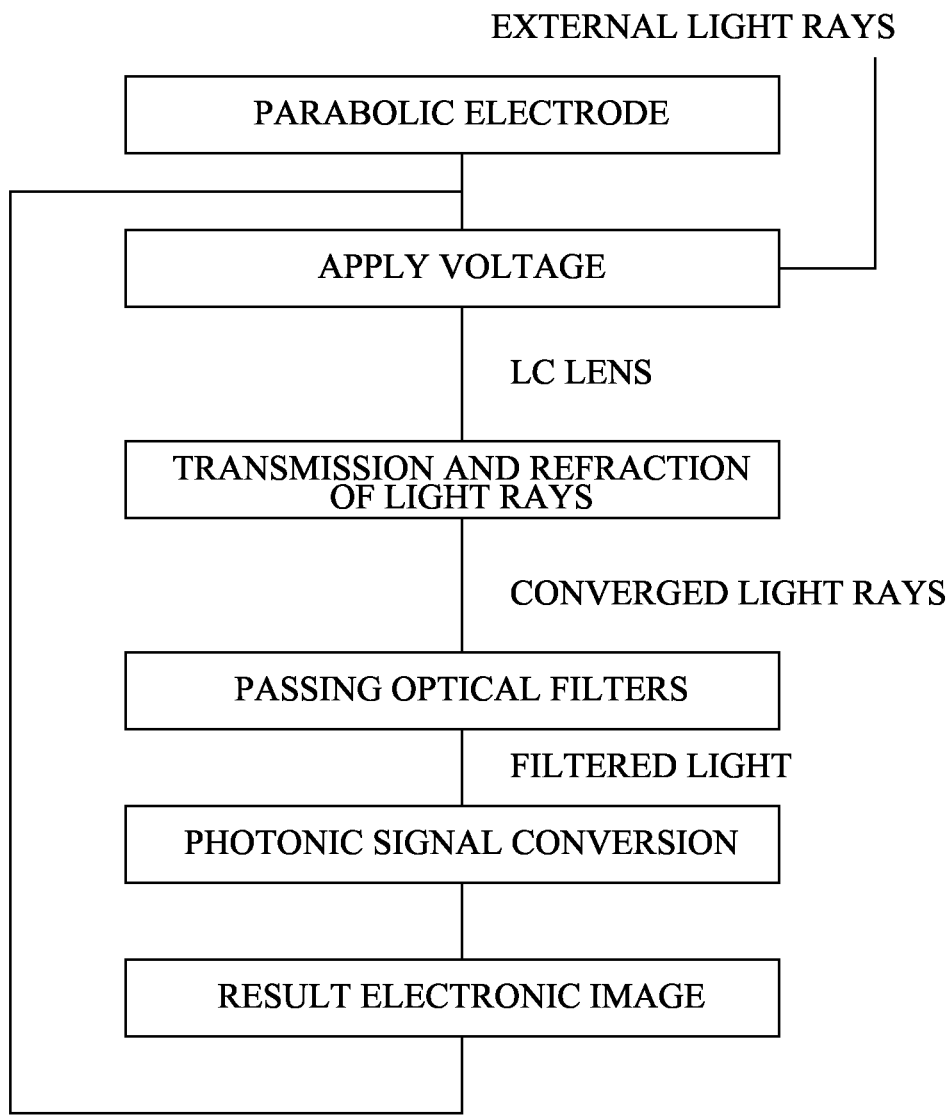
FIG. 5 illustrates optical sensing process based on the LC lens.

The optical sensing process based on the LC lens is summarized in FIG. 4 and FIG. 5. The light rays 410 first pass through the holes 400 cut from the color filters 420 and then reach the LC layer 430. As controlled by the additional circuitry, the parabolic electrode 440 applies a voltage to the LC molecules and generates a LC lens 450. The light rays pass through the LC lens 450 and converge at the photoreceptor 460. An optical filter 470 allows only a certain range of light, either visible or IR, to pass through. The photoreceptor 460 receives the filtered light and converts photonic signals to electronic images.

The compound-eye optical sensing module preferably utilizes a large number of dispersed optical sensors to capture the images of the scene in front of the display. The images captured by each sensor are not suitable to be used directly for analyzing the whole scene. Such images have low pixel resolution due to the small number of photoreceptors, ranging from one single pixel to 16 by 16 pixels. Furthermore, the small aperture and low convergence of the micro lens tend to result in a blurry image.

Any technique may be used to reconstruct a high-resolution (HR) color image from these low-resolution (LR) images. After the reconstruction, the original set of small-aperture and blurry LR images collected from the dispersed sensors is registered and converted into a HR image that captures the whole scene in front of the display with wider field of view and sharper details. Besides the HR color image that captures the appearance of the viewing environment, a depth HR image may also compute for sensing the 3D structure of the scene in front of the display. This reconstruction process may be designed to simulate the biological process within the brains of arthropods with compound eyes.

For LCD devices, a reconstruction technique may take advantage of the LC lens. A series of different voltages may be applied to the LC layer to generate a series of LC lenses with different focal lengths. The captured LR images are processed by a shape/depth from the focus technique and converted into a color and depth image simultaneously.

Figure 6:
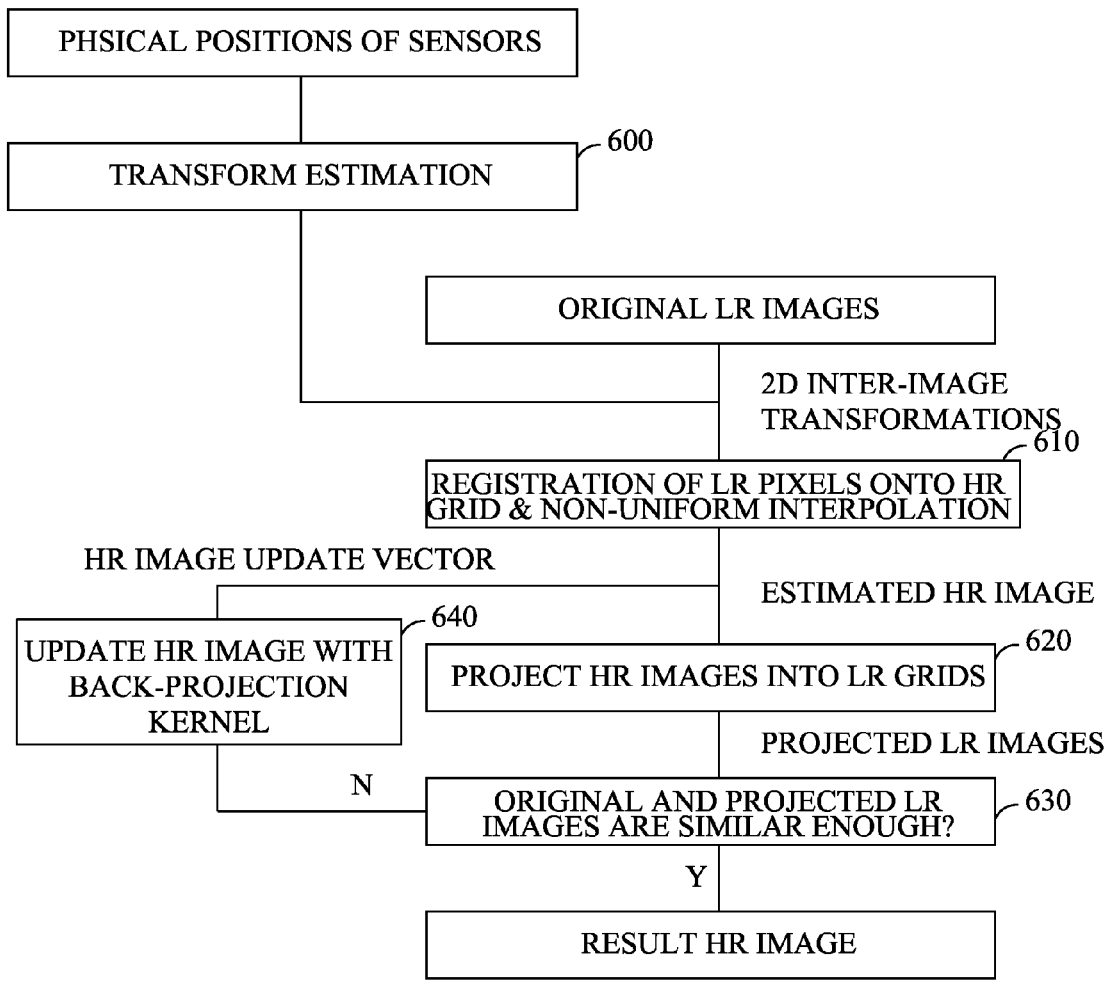
FIG. 6 illustrates reconstructing HR color image from compound eye LR images.

The reconstruction of HR color images based on compound-eye images can be formulated as a multi-image super-resolution problem. Those images from the visible light sensors may be used in the estimation. An iterative reconstruction process is illustrated in FIG. 6.

The first step of the reconstruction process is to compute 2D geometric transformations 600 between the LR images, which are used to register the LR images to the HR grids later. The 2D perspective transformation is a commonly selected inter-image transformation for registering the pixels between two LR images. It is computed based on the known 3D positions of compound-eye sensors and the parameters of each sensor, including focal length and image centers.

Since each sensor in the compound-eye sensing module ideally sees only a small different part of the scene (if the LC lens is perfect), the HR image that captures the whole scene is created by registering multiple LR images to the HR image grids 610. With one LR image taken as the reference, all the other LR images are projected to the HR image grids 620 based on the reference image, by the 2D inter-image transformations. As each pixel in the HR image may correspond to multiple pixels in LR images, the corresponding value of the HR pixel is determined by non-uniform interpolation of LR pixels 630. Since the LC lens will generally be of poor quality, it will end up collecting light over a wider angle than needed for depth of focus issues. Essentially, each capture sensor can be regarded as having a very large point spread function (PSF).

The registered HR image is usually blurry and contains significant noise and artifacts. The "true" HR color image is recovered by an iterative image restoration process. The current estimate of HR image is projected into the LR image grid and generates a number of projected LR images. The differences between the original and projected LR images are evaluated and used to update the HR image 640 based on a back-projection kernel approach. The process continues until the image difference is small enough or the maximum number of iterations has been reached.

Figure 7:
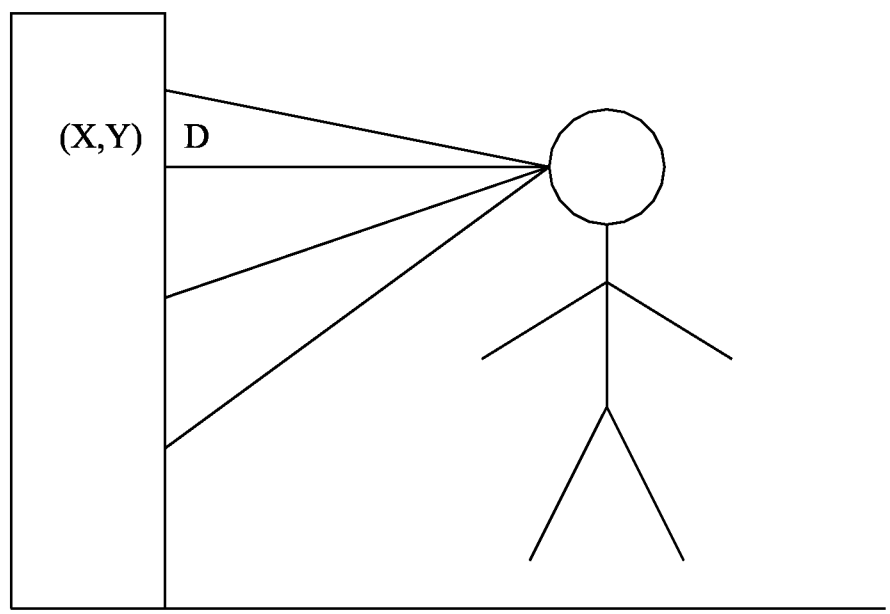
FIG. 7 illustrates a 3D depth image.

As the scene in front of the display is observed by multiple sensors at different positions at the same time, the 3D depth cues of the scene are inherently embedded in the LR images. The 3D scene structure can be computed based on the multi-view LR images. A depth image may be defined in the same resolution of the HR color image, where the value for each pixel p(x, y) is the 3D depth d, or the perpendicular distance from the point on the display screen to a point in the scene, as shown in FIG. 7. The display screen serves as a reference plane in the 3D space with its depth as zero. The depth of any scene point is larger than zero, as all the points lie on one side of the sensing module.

The depth image (x, y, d) serves as a compact representation of the 3D scene. Given a pixel (x, y) and its depth value d, a 3D point can be uniquely located in the scene. The depth image can also be converted into other 3D representations of the scene, including 3D point clouds and mesh structures.

Figure 8:
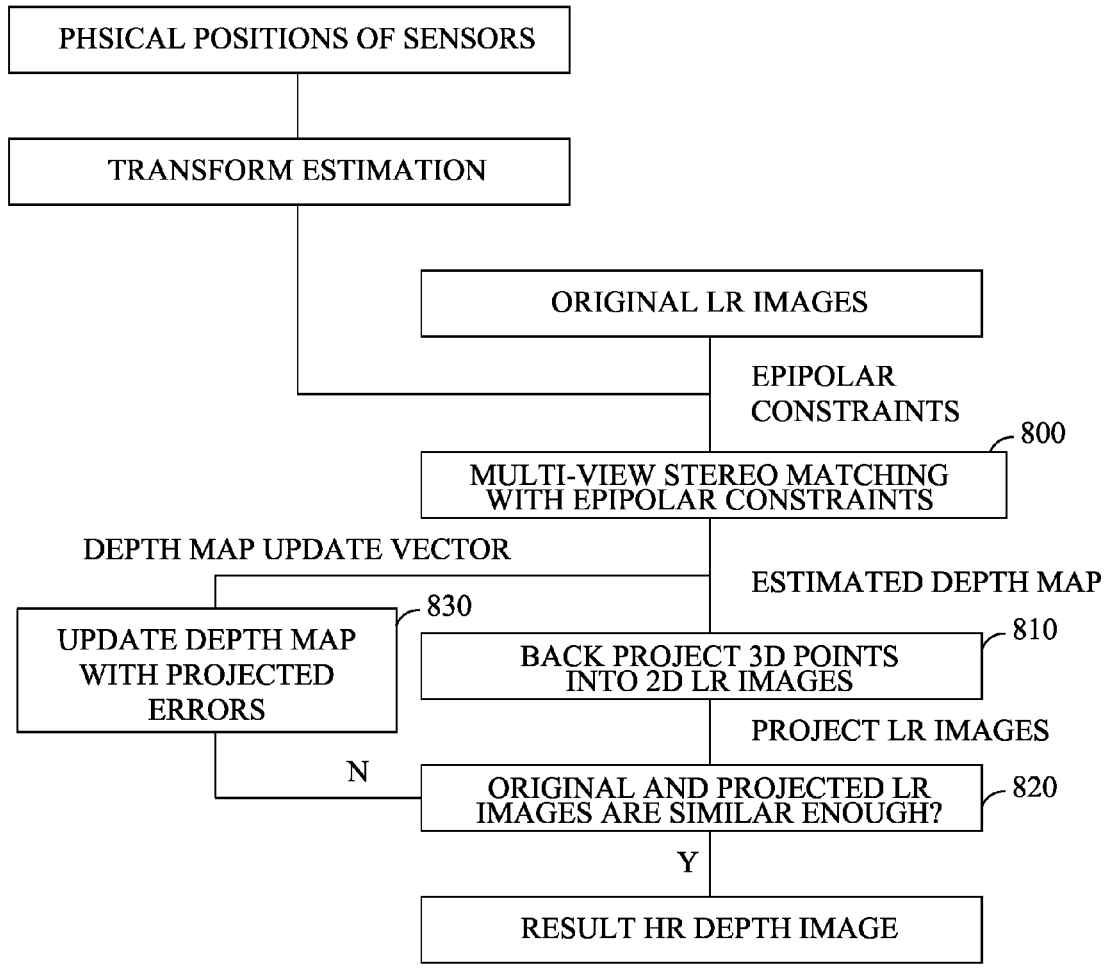
FIG. 8 illustrates estimate HR depth image from LR compound eye images.

The depth image may be estimated by an iterative optimization technique as shown in FIG. 8. The technique uses the 3D positions and orientation of compound-eye sensors, and the LR images captured by both visible light and IR light sensors.

The 3D position of a scene point can be determined by intersecting the optical rays in the 3D space. As shown in FIG. 7, a 3D point can be uniquely determined by intersecting two rays. In practice, this intersection may be implemented as the stereo matching of 2D image pixels. A pair of pixels in different images are said to be matched if the difference between their adjacent regions is below a pre-defined threshold. Once a pair of two pixels is matched across two images, the depth is computed by intersecting the two corresponding optical rays in the 3D space.

This technique may utilize an inter-image transformation, called the epipolar constraint 800, to match the images. Given a pixel in one image, the epipolar constraint generates a 2D line in the other image. The stereo matching process searches along the 2D line and finds the pixels with minimal matching difference.

A HR depth image is estimated by matching all pairs of LR images. Then the 3D points corresponding to the estimated depth image is projected back 810 to the 2D images. Similar to the method for color images, the difference between the original and projected LR images are evaluated 820 and used to update 830 the HR depth image, until the difference converges to a small value.

The above two reconstruction techniques are suitable for the compound-eye sensing module integrated into all kinds of display devices. For the LCD devices, there is an additional feature of electrically controllable LC lens to estimate the color and depth of the images for LCD images at the same time by utilizing this feature.

A good characteristic of the LC lens is that its focal length can be accurately controlled by the varying voltage. When a series of voltage values is applied to the LC molecules, the compound-eye optical sensors capture a series of images of the scene with varying focal lengths. This is equivalent to taking photos of the scene with a multi-focus lens at the same viewpoint.

Figure 9:
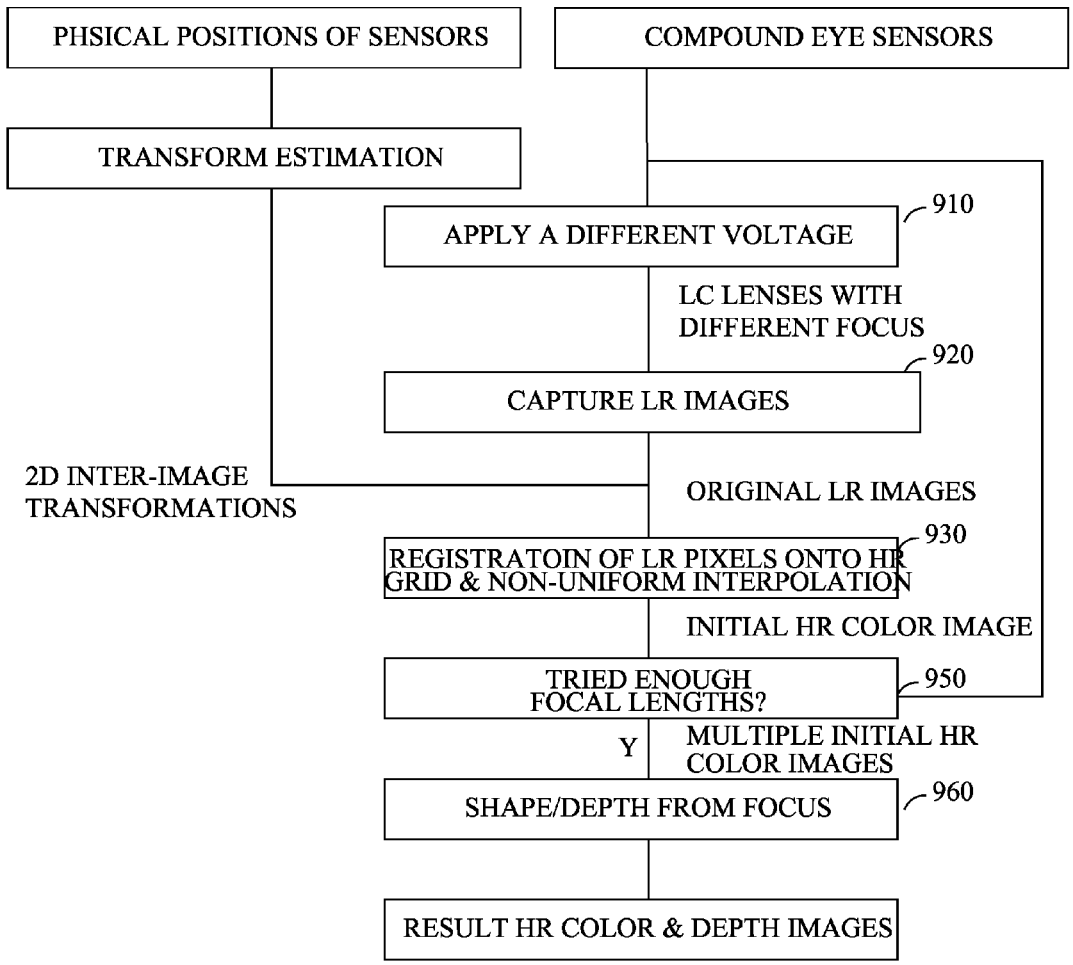
FIG. 9 illustrates estimation of HR color and depth images for LCD.

The reconstruction technique starts by taking multiple shots of the scene with varying focal lengths, as shown in FIG. 9. At each time, a different voltage 910 is applied to the parabolic electrodes that are in contact with the LC layer, resulting in LC lenses with a different focal length. The LR images captured 920 by the compound-eye sensors are registered into an initial HR image 930, similarly to the method for general display devices. Due to the short depth of field and small aperture of compound-eye sensors, the initial HR image may be blurry and contains noise and artifacts. Instead of recovering the true HR color images at this step, one may generate a number of initial HR color mages 950 for later processing.

Figure 10:
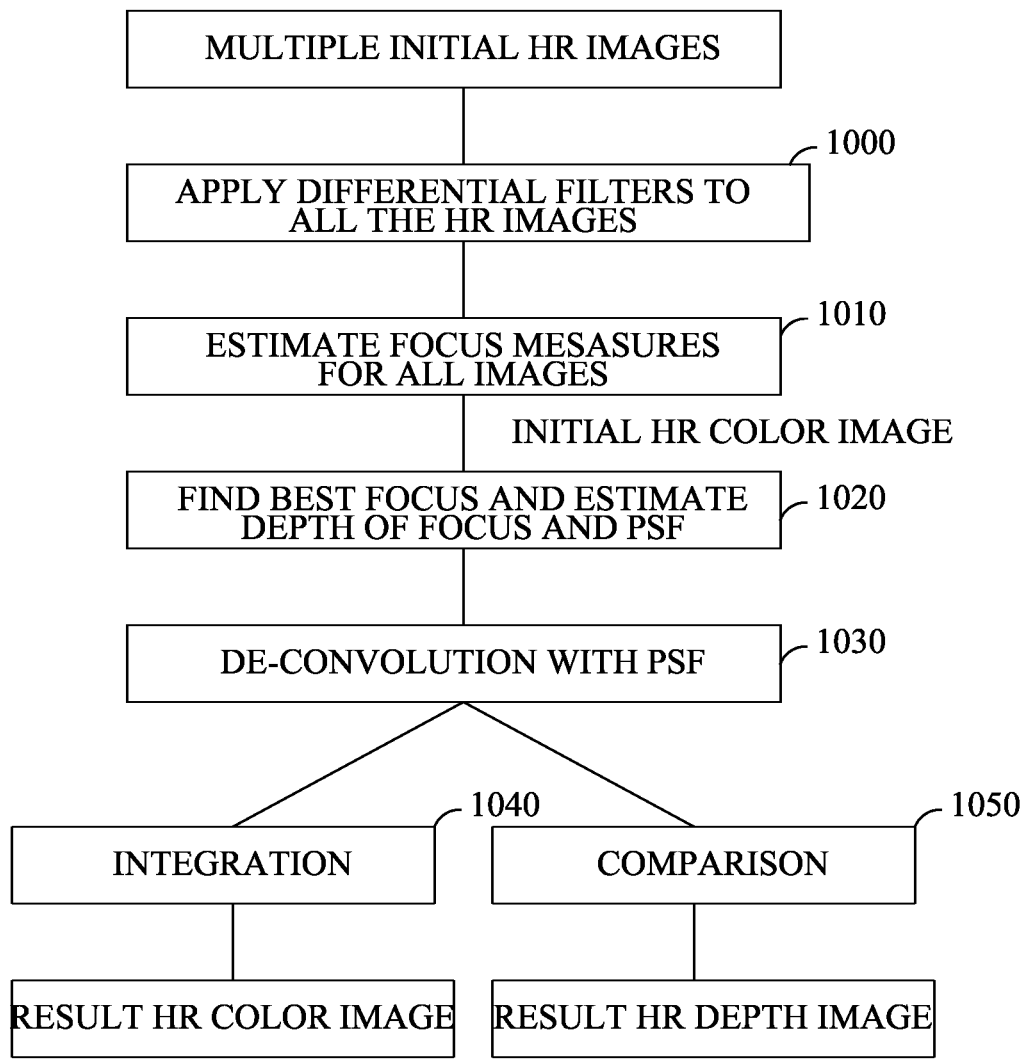
FIG. 10 illustrates shape and depth from focus.

After trying enough focal lengths 950, the system obtains a set of initial HR color images, each of which is the image of the same scene generated with a different focal length. Due to the short depth of field of compound-eye sensors, the initial HR image may be partially or completely out-of-focus. Namely, part of the image may be in focus while the rest of the image is blurry. In the extreme case, the whole image is out-of-focus and blurry. The set of initial HR images are fed into a shape/depth from focus process 960, which is illustrated in FIG. 10.

Despite the out-of-focus regions in the initial HR images, these images still provide information about the true scene. The shape from focus and depth from focus techniques are applied to recover the underlying color and depth images of the scene. The out-of focus region in an image may be characterized as the convolution of the point spread function (PSF) with the corresponding part of the true scene. Multiple out-of-focus regions will provide cues for solving the PSF based on the known focal length and the depth of field.

Estimation of the color and depth images is related to each other. For a certain region in the image, it is possible to obtain the in-focus image of that region when the depth of focus is also known. On the other hand, once an image region is clear and in focus, the depth of focus can be determined by this region. The color and depth images can be estimated jointly by the same process.

The first step is to apply differential filters 1000 to the images and then compute the image characteristics 1010. For example, Laplacian filters can be applied to multiple images in order to find the sharp edges. Then the best focus is found by comparing all the filtered images 1020. For a certain image region, if one image is selected as the best focus, the depth of focus of this image is also computed. The corresponding regions in all the other images are considered as being convoluted with a point spread function (PSF). The in-focus versions of the same region are estimated by de-convolution with the PSF 1030 in the image domain or inverse filtering in the frequency domain. After de-convolution with the PSF, the originally out-of-focus regions become clear and sharp as long as the right depth and PSF are found.

The HR color image 1040 is computed by integrating the multiple de-convoluted images. In this image, every part of the scene is in focus. In contrast, the HR depth image 1050 is obtained by comparing the original and de-convoluted HR color images and selecting the best depth of focus for each image pixel.

All three image reconstruction techniques are highly parallel as independent operations are applied to each pixel. Therefore, the reconstruction process can be accelerated by dividing the large task for the whole image into multiple sub-tasks for each pixel on multi-core CPUs or GPUs (graphics processing units). After efficient implementation and optimization, the reconstruction methods can run in real time or close to real time, which allows the real-time seeing and interaction ability of the display.

The compound-eye sensing module enables the display to see the scene in front of it in real time. This seeing capability adds another capability to the display, namely the interaction capability. Based on the color and depth images of the scene, the display is capable of interacting with the viewers and also the viewing environment.

It is desirable that the display system reacts to the ambient environment and alters the content shown on the display in response. The ambient environment may include the natural and artificial lighting conditions, the static background, and the human viewers. There are frequent dynamic changes in the environment, including turning on/off a light source, different times of day where the lighting conditions change (such as the ambient light levels), and viewers' motion. Thus the display may react to the ambient environment and becomes an integrated part of the viewing environment.

The sensor should also react to local changes in the ambient environment, such as turning on/off a single light source, and modifying part of the image on the display in response. In addition, the sensor may sense the local changes in the environment and viewers' motion, and make reactions by altering the whole or partial content on the display. In other words, the display is able to sense the ambient environment and adjust its content in response to the environment.

An example of integrating the display system starts with an original room that includes bedroom furniture having a large blank wall. The large blank wall may be replaced by a wall sized display. The display on the wall may show an image that is complimentary to the bedroom furniture, such as a scene of an ocean or other panoramic view. In some cases, the large display may act as a virtual window to the outside world. The virtual window on the display connects with the physical world and acts as a natural extension of the physical world. The virtual window may be rendered in a manner accounting for a suitable perspective in relation to the location of the viewer so that it provides a natural feeling to the room.

The display may also react to the illumination in the physical room. When a lamp or other direct light source is turned off, the display may be too bright, which creates an unnatural feeling. When the direct light source is turned off, the display may dim itself. Another example is to allow the ambient display to automatically react to the natural lighting in the room. The image appearance may automatically change along the time of the day as the lighting changes. For example, when a room is illuminated by a yellow light from a lamp, the ambient reactive display extends the yellow light to the virtual scene by modifying the image content to provide a more natural feeling to the viewers.

The distribution and changes of the ambient environment are reflected into the content on the display, primarily a 3D virtual scene. In one embodiment, the ambient sensing system serves as an ambient sensor that reacts to the global illumination change and adjusts the image content's brightness and contrast. In the preferred embodiment, the physical light sources are converted into virtual light sources and used to illuminate the 3D virtual scene, based on 3D graphics rendering techniques. This process may continue until the display is turned off or the viewer has left the room.

Figure 11:
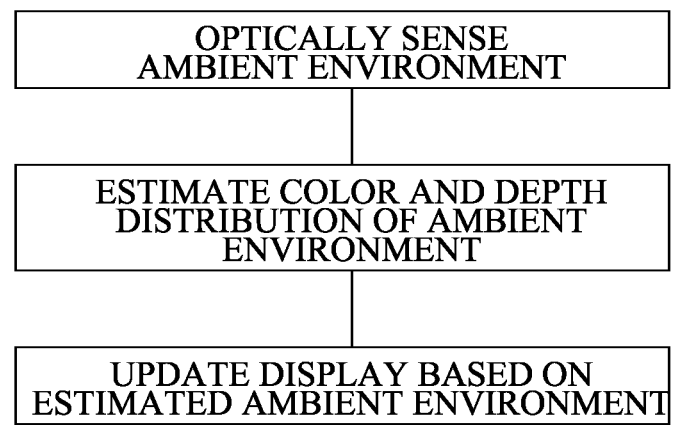
FIG. 11 illustrates updating the display based on estimated ambient environment.

Referring to FIG. 11, the multiple images captured by the optical sensors are analyzed for the estimation of color and depth distribution of the ambient environment. The ambient environment may include moving objects (e.g., human viewers), direct light sources, light reflective surfaces, and the static background (e.g., furniture). The display is updated based upon the ambient environment.

Figure 12:
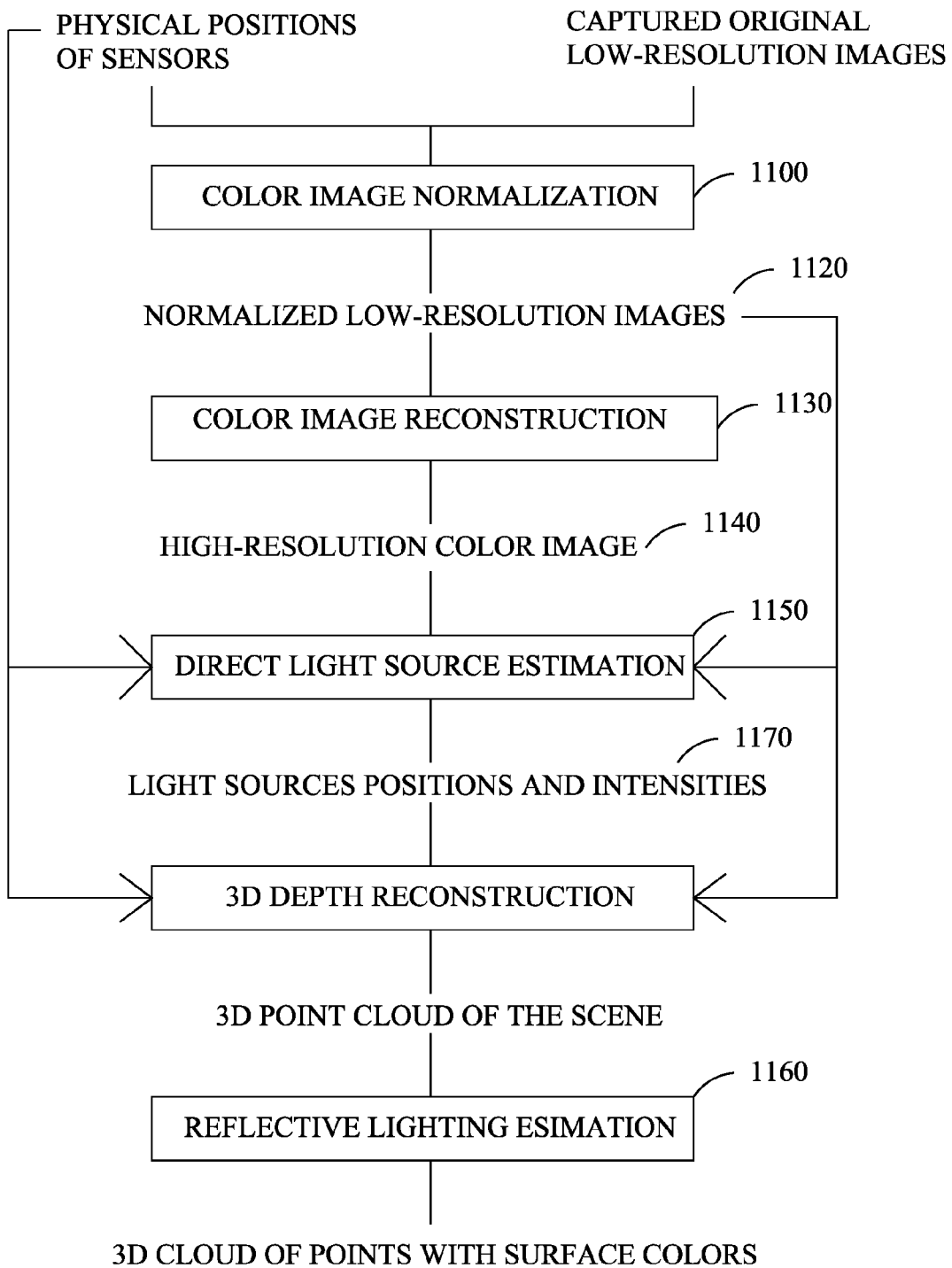
FIG. 12 illustrates determining a 3D cloud.

Referring to FIG. 12, for LCD displays, the LC layer switches between the various states of being opaque and being transparent. The duration of the transparent period determines how much the light the optical sensor can receive and consequently determines the brightness of the sensed image. Over time, even for a uniform display the sensed optical signals keep changing, which causes difficulty in image processing. Therefore, a signal normalization process 1100 may be used. Let $T_0$ denote the length of a total refresh time period and $T_1$ as the length of the period during which the LC layer is transparent at a certain position (x, y) on the display. The sensed signal value may be $V_1(x, y)$, the normalized image signal value $V_0(x, y)$ may be determined as follows:

$$V_0(x, y) = \frac{T_0}{T_1} V_1(x, y)$$

The normalization process 1100 may also take into account any differences in the sensitivity of the optical sensors, etc. This normalization process may be applied in the light signal domain. It may also be applied in the image code value domain after gamma correction. The result is normalized low-resolution images 1120.

The normalized low-resolution images 1120 are then combined and filtered by a color image reconstruction 1130 into a high-resolution color image 1140 which represents the color appearance of objects. The depth for objects in the scene are estimated based on the sensor positions and the color images.

Before estimating the depth maps, however, it is desirable to determine the direct light sources 1150 and reflective lighting 1160 in the ambient environment. The direct light sources can be differentiated from light reflecting surfaces by identifying bright and uniform regions that do not have regular physical dimensions. If direct light sources are processed in the same manner as regular objects, it tends to introduce significant errors into depth maps. The estimation 1150 results in the identification of different direct light sources, their position, their extent, and/or their intensities 1170.

Direct light sources may be differentiated from light reflecting surfaces by using multi-image information (e.g., epipolar constraint). The direct light sources tend to be bright regions with similar intensities across the images. In contrast, the characteristics of reflective surfaces, i.e. reflective lighting, tend to change with different incidental angles for the cameras. Also, the direct light source regions tend to be uniform in color and have little texture, as they emit light directly into the optical sensors. The reflective surfaces, in contrast, tend to have strong edges and may contain some texture.

Figure 13:
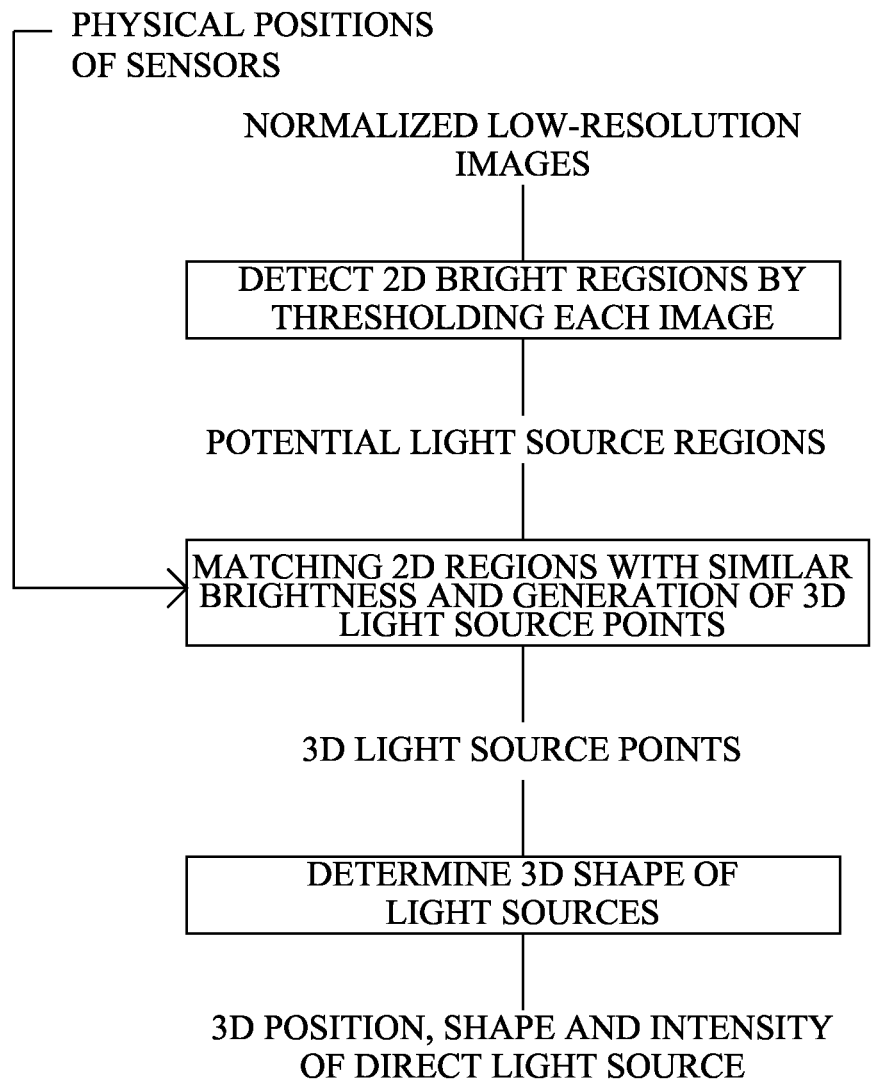
FIG. 13 illustrates direct like source estimation.

An exemplary technique for detecting direct light sources is illustrated in FIG. 13. The technique takes an input the normalized 2D images and the inter-image transformations computed from camera positions. Two thresholds are applied to select potential light source regions from each normalized 2D image. The first threshold is applied to the image code values to segment the bright regions out. Pixels brighter than the first threshold are labeled as potential light sources. The second threshold is applied to the gradient magnitude (computed by Sobel filter) of each pixel in the potential light source region. Those pixels with their gradients larger than the second threshold are removed from the potential regions, as the light source regions should contain little texture.

Then each pixel in the potential light source regions is mapped to other images by the inter-image transformations. The intensity of the mapped pixel is compared to that of the original pixel at the same position. If the intensities are similar, a 3D point is computed by intersecting 3D rays back-projected from these two pixels (namely a 3D triangulation process). Otherwise, no 3D point is computed from these two pixels. The process is repeated for all pixels in the potential light source regions from all images.

After this matching process, a set of 3D points belonging to the light sources is formed. The 3D point cloud may be further refined by spatially smoothing it in the 3D space. The light sources in the physical environment are shaped as points, lines, or planes. The point cloud is fitted to several 3D spheres with different radii, a 3D line, or a 3D plane by least-squared fitting. The shape on which the minimum error is obtained is considered to be the true shape of the light source. The 3D positions and dimensions of the light sources are also finalized after the shape is fixed.

Figure 14:
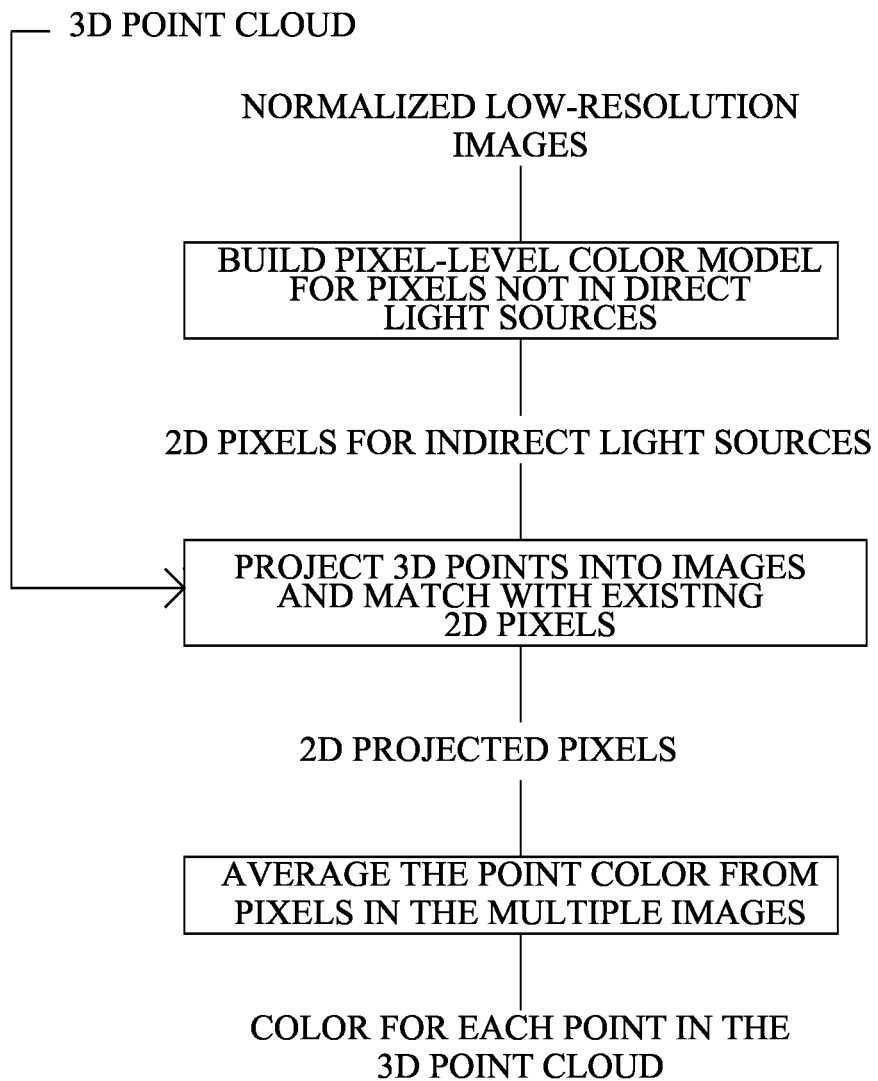
FIG. 14 illustrates reflective lighting estimation.

After detecting the direct light source and 3D reconstruction of the point cloud, the pixels that do not belong to the direct light sources are grouped and used for estimating the light reflective surfaces, i.e., reflective lighting. The background light is defined as a set of 3D surface points that reflect the colorful light from a light source invisible to the sensors. The task of estimating the reflective lighting is illustrated in FIG. 14. In each 2D image, an image background modeling process is applied to obtain a Gaussian distribution of the brightness and color for a certain 2D pixel. At the same time, the 3D point cloud is re-projected into the 2D images. For all the projected pixels that overlap with the existing pixels, the colors from the Gaussian model in different images are integrated and averaged into a single color. This color is assigned to the 3D point, as part of the reflective lightings. After the 2D pixel-level Gaussian model is updated at each new frame, the 3D point colors are also updated to reflect the dynamic change of the ambient environment.

The ambient color and depth estimation process may continue after the cameras capture more images. The information at the previous time instant can be utilized to facilitate the estimation process. This may be implemented as a temporal tracking process. One embodiment is to apply Kalman filter to dynamically update the properties of different parts of the ambient environment. The Kalman filter is used to smooth and predict the color and depth of the static background, the color and 3D position of the light sources, and the color, depth, and motion of human viewers. Another embodiment is to use non-linear optimization methods, such as a Levenberg-Marquardt method, to directly estimate the parameters based on the 2D image measurements.

Figure 15:
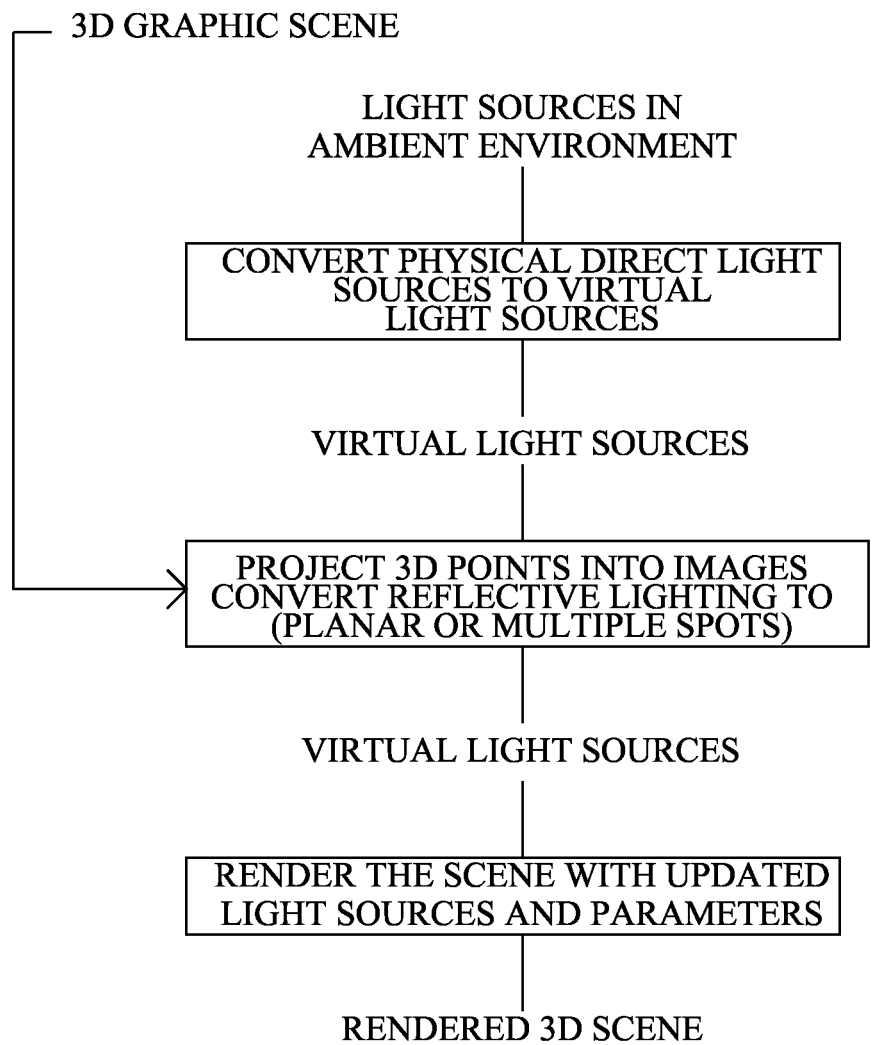
FIG. 15 illustrates virtual scene illumination.

There are many techniques to apply the estimated color and depth distribution of the ambient environment to update the image on the screens. One preferred embodiment is to utilize both the direct light sources and the reflective lightings to alter the scene, as illustrated in FIG. 15.

The physical direct light sources are converted into their counterparts in the virtual 3D scene. If the light source looks like a small circular plate in the image, a spot light source is added to the virtual scene. Or if the light source looks like a long line in the image, a virtual line shaped light source is added. The motion of the physical light sources is also mapped to the 3D movement in the virtual world.

The reflective lighting is converted into one or more virtual light sources. One embodiment is to convert the reflective lighting into a large planar light source based on orthogonal projection of the scene points. The virtual planar light source is both parallel to the display surface and also has the same size of the display surface. The color of each point on the light source is determined by orthogonally projecting the 3D point cloud onto the plane and finding the color of the intersected points. In the mathematical terms, if the coordinate of an original point in the point cloud is (X, Y, Z), with the origin as the center of the display surface, the 2D position of the intersected point is (X, Y). The color of the point (X, Y, Z) is transferred to the 2D position (X, Y). This planar light source is then used in the graphics rendering process to illuminate the virtual scene. Another embodiment is to group the 3D points with similar positions and colors into a cluster and then convert each cluster into a spot light source. Then a number of spot light sources are used together to simulate the real life lighting experience of reflecting lights to a 3D environment.

Standard 3D graphics rendering techniques, e.g., shading and color interpolation, are applied to render the 3D scene with the virtual light sources generated from the direct light sources and the reflected light sources.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A display with an integrated imaging sensor comprising:
 (a) said display including a plurality of pixels;
 (b) said imaging sensor integrated within said display and including a plurality of individual sensors each of which provides an output;
 (c) processing said output of each of said individual sensors to generate an image;
 (d) differentiating between a direct light source of said image from light originating external to said display having a visible light spectrum and a reflected light source of said image from light originating internal to said display having an infra red light spectrum;
 (e) wherein a display image displayed on said display is modified based upon said output.

2. The display of claim 1 wherein said displayed image displayed on said display is modified in accordance with said differentiating.

3. The display of claim 2 wherein only a part of said displayed image is modified in accordance with said differentiating.

4. The display of claim 1 wherein said imaging sensor includes a photoreceptor, a filter, and a micro lens per each imaging sensor element.

5. The display of claim 4 wherein said filter is a visible light filter.

6. The display of claim 4 wherein said filter is an infra-red light filter.

7. The display of claim 6 wherein said display further includes an infra-red light source.

8. The display of claim 1 wherein said imaging sensors are interspersed in said display pixel array.

9. The display of claim 1 wherein said sensor includes a lens constructed from liquid crystal material.

10. The display of claim 1 wherein said sensors are arranged in such a manner to sense a three dimensional structure in front of said display.

11. The display of claim 10 wherein said sensors have a different focal length based upon different voltages applied to a liquid crystal layer of said display.

12. The display of claim 10 wherein said display generates a three dimensional depth image of the scene.

13. The display of claim 1 wherein a viewing environment associated with said display includes direct light sources.

14. The display of claim 1 wherein a viewing environment associated with said display includes light reflective surfaces.

15. The display of claim 1 wherein a viewing environment associated with said display includes a viewer.

16. The display of claim 15 wherein said depth image is a color image.

17. A display with an integrated imaging sensor comprising;
   (a) said display including a plurality of pixels;
   (b) said imaging sensor integrated within said display and including a plurality of individual sensors each of which provides an output, and said sensors differentiating between a direct light source of a sensed image from light originating external to said display having a visible light spectrum and a reflected light source of said sensed image from light originating internal to said display having an infra red light spectrum;
   (c) processing said output of each of said individual sensors to generate a three-dimensional image including color and depth;
   (d) modifying different portions of said displayed image on said display differently based upon said color and said depth.

18. The display of claim 17 wherein said modifying includes modification of the colors of said displayed image.

19. The display of claim 17 wherein said processing includes color image normalization.

20. The display of claim 19 wherein said processing includes color image reconstruction.

21. The display of claim 20 wherein said processing includes direct light source estimation.

22. The display of claim 21 wherein said processing includes three dimensional depth reconstruction.

23. The display of claim 22 wherein said processing includes reflective lighting estimation.

* * * * *